United States Patent [19]

Klyce

[11] 4,161,309

[45] Jul. 17, 1979

[54] FLUID BY-PASS/SEAL MEANS

[75] Inventor: Thomas A. Klyce, Memphis, Tenn.

[73] Assignee: Mohawk Valve Company, Bartlett, Tenn.

[21] Appl. No.: 828,199

[22] Filed: Aug. 26, 1977

[51] Int. Cl.² .............................................. F16K 3/02
[52] U.S. Cl. .................................... 251/328; 251/329
[58] Field of Search ................ 251/328, 172, 175, 329

[56] References Cited
U.S. PATENT DOCUMENTS

| | | | |
|---|---|---|---|
| 3,006,601 | 10/1961 | Anderson et al. | 251/328 X |
| 3,307,826 | 3/1967 | Lowrey | 251/175 X |

Primary Examiner—Arnold Rosenthal
Attorney, Agent, or Firm—John R. Walker, III

[57] ABSTRACT

A gate valve having seal members adapted to allow fluid to flow between the upstream seat and the valve housing when the fluid is flowing or attempting to flow in a forward direction, or between the downstream seat and the valve housing when fluid is flowing or attempting to flow in a backward direction, to allow the pressure exerted by the fluid against the upstream and downstream seats and the gate to be substantially equalized while still preventing fluid from incorrectly flowing through the valve.

7 Claims, 6 Drawing Figures

FLUID BY-PASS/SEAL MEANS

BACKGROUND OF THE INVENTION

1. Field of the Invention:

This invention relates to fluid valves and more specifically to seal means for gate-type fluid valves.

2. Description of the Prior Art:

Heretofore, various gate-type fluid valves have been developed. Many of these valves have gates and seats made of ceramic material for reducing the wear and erosion thereof. While such gates and seats do reduce the wear and erosion thereof, they are very susceptible to breakage and fracture caused by the high pressure exerted thereon by the fluid. Typically, a seal member such as a standard O-ring or the like is placed between each seat and the valve housing to prevent any fluid from incorrectly passing between the seats and the valve housing so as to prevent improper and incorrect escapage or passage of fluid through the valve especially when the valve is closed. These O-rings are tightly inserted between each seat and the valve housing in such a manner that the O-rings are non-movable and prevent at all times any and all flow or passage of fluid between the valve housing and the seats. While these seal members accomplish a necessary function, they cause unequal pressure and stress to be exerted on different sides or portions of the gate and seats which often results in fracture or breakage of the gate and/or seats.

SUMMARY OF THE INVENTION

The present invention is directed towards overcoming the problems and advantages of prior gate-type valves. The concept of the present invention is to provide a gate-type valve with means for relieving substantially all of the pressure exerted on the gate and seats thereof by the fluid passing or attempting to pass therethrough.

The fluid by-pass/seal means of the present invention includes a first means positioned intermediate a first seat member and the valve housing of a gate valve for allowing fluid to flow between the first seat member and the valve housing when fluid is flowing into or attempting to flow into the gate valve in a forward direction and for preventing fluid from flowing between the first seat member and the valve housing when fluid is flowing into or attempting to flow into the gate valve in a backward direction, and includes a second means positioned intermediate a second seat member and the valve housing for allowing fluid to flow between the second seat member and the valve housing when fluid is flowing into or attempting to flow into the gate valve in a backward direction and for preventing fluid from flowing between the second seat member and the valve housing when fluid is flowing into or attempting to flow into the gate valve in a forward direction.

DESCRIPTION OF THE PREFERRED EMBODIMENT

Figure 1:
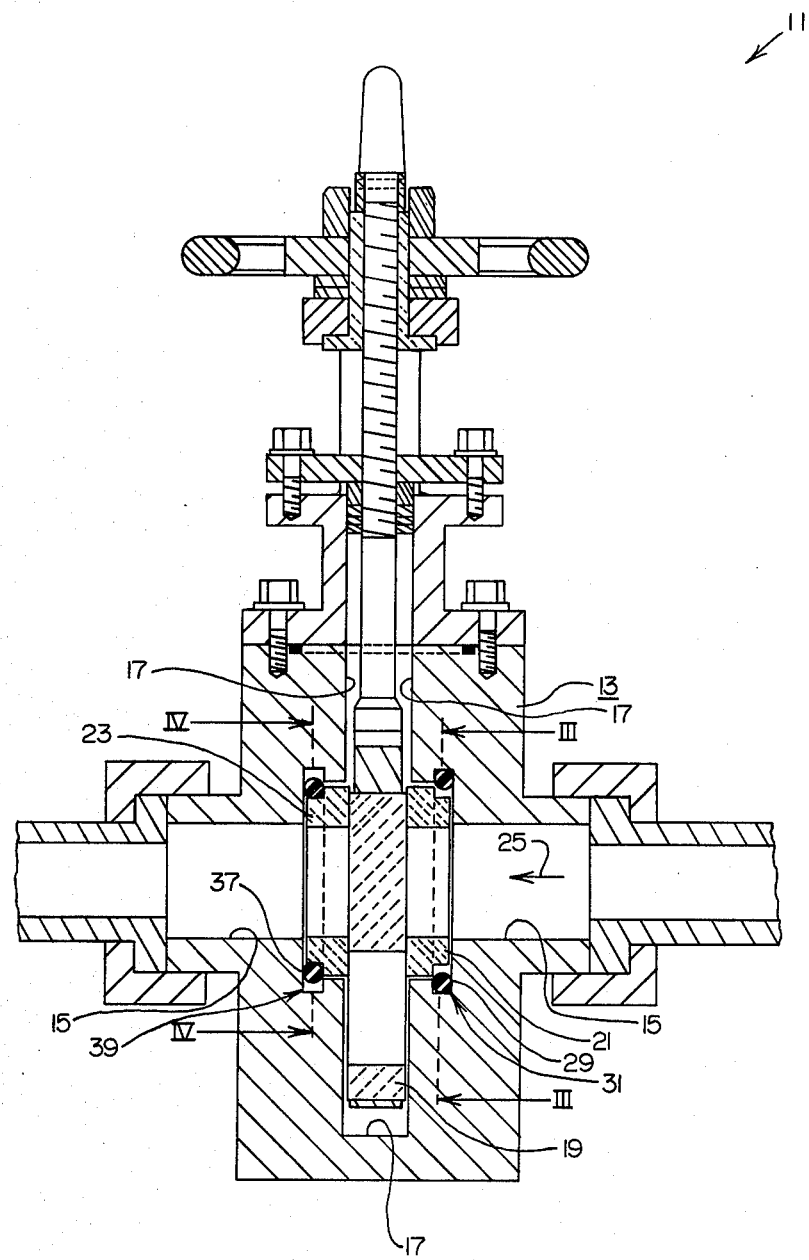
FIG. 1 is a sectional view of a gate valve including the fluid by-pass/seal means of the present invention and shown with fluid entering or attempting to enter the valve housing in a forward direction.
Figure 2:
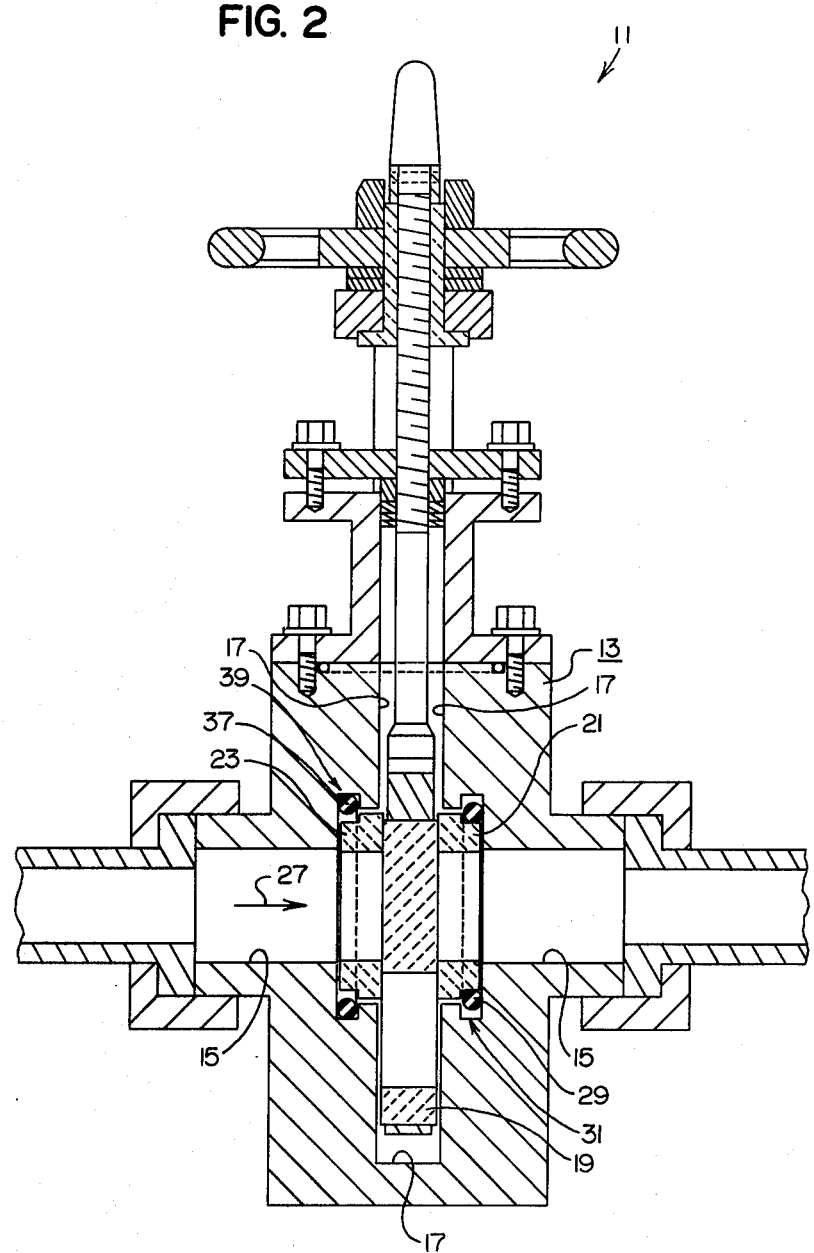
FIG. 2 is a sectional view of a gate valve including the fluid by-pass/seal means of the present invention and shown with fluid entering or attempting to enter in the valve housing in a backward direction.
Figure 3:
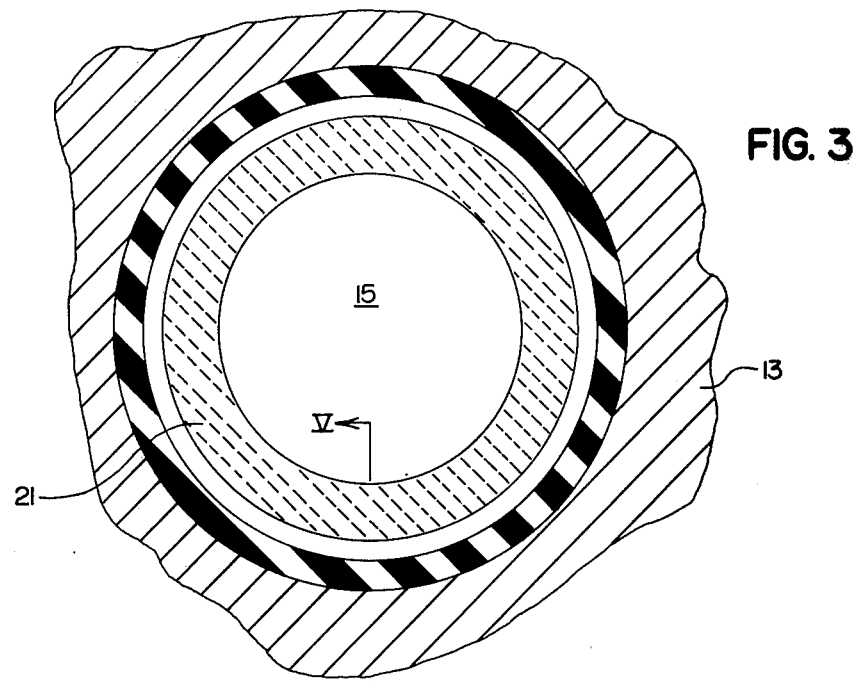
FIG. 3 is a sectional view as taken on line III—III of FIG. 1.
Figure 4:
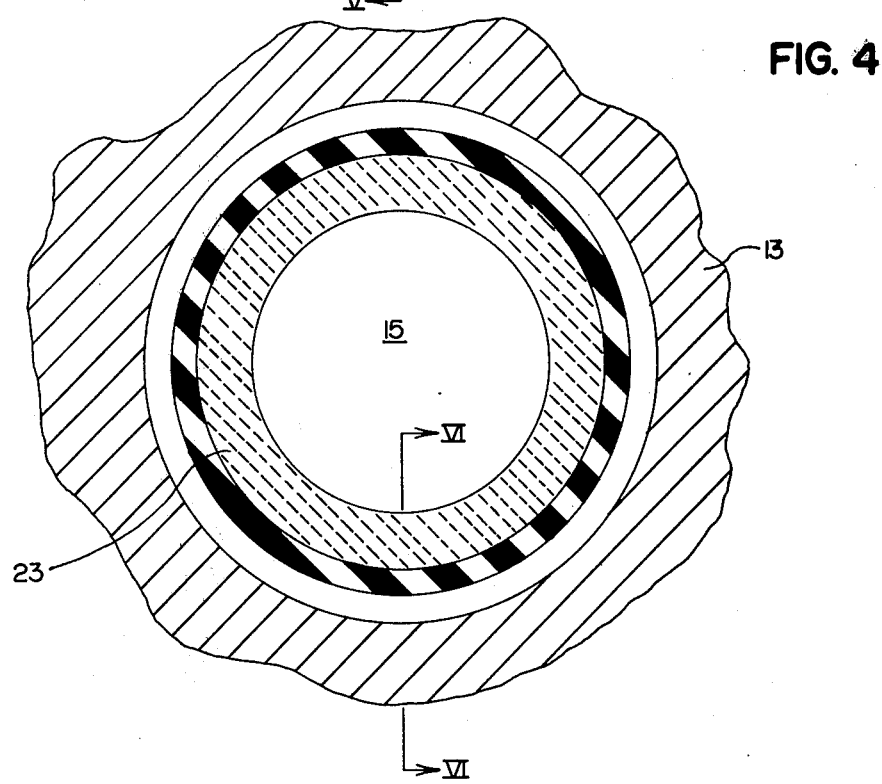
FIG. 4 is a sectional view as taken on line IV—IV of FIG. 1.

The fluid by-pass/seal means of the present invention is for use with a gate-valve 11 of the type including a valve housing 13 having a fluid passageway 15 therethrough for allowing fluid to flow therethrough and having a gate-receiving chamber 17 positioned substantially transverse to and in communication with the fluid passageway 15, including a gate member 19 reciprocatingly mounted in the gate-receiving chamber 17 for movement between a position in which fluid is allowed to freely flow through the fluid passageway 15 and a position in which fluid is prevented from flowing through the fluid passageway 15, including a first donut or annular-shaped seat member 21 positioned in the valve housing 13 intermediate the fluid passageway 15 and the gate-receiving chamber 17 on the upstream side of the gate-receiving chamber 17, and including a second donut or annular-shaped seat member 23 positioned in the valve housing 13 intermediate the fluid passageway 15 and the gate-receiving chamber 17 on the downstream side of the gate-receiving chamber 17 (see, in general, FIGS. 1 and 2). The fluid by-pass/seal means of the present invention includes, in general, a first means positioned intermediate the first seat member 21 and the valve housing 13 for allowing fluid to flow between the first seat member 21 and the valve housing when fluid is flowing into or attempting to flow into the fluid passageway 15 in a forward direction as indicated by the arrow 25 in FIG. 1 and for preventing fluid from flowing between the first seat member 21 and the valve housing 13 when fluid is flowing into or attempting to flow into the fluid passageway 15 in a backward direction as indicated by the arrow 27 in FIG. 2. It should be noted that the direction of fluid flow in FIGS. 1 and 2 indicated by the arrows 25, 27 are denominated as forward and backward for sake of illustration only. That is, the arrows 25, 27 are used to show fluid flow in opposite directions and, while neither direction can be technically termed backward, fluid flow in the direction of the arrow 27 in FIG. 2 is denominated as "backward" for purpose of illustration. The fluid by-pass/seal means of the present invention also includes a second means positioned intermediate the second seat member 23 and the valve housing 13 for allowing fluid to flow between the second seat member 23 and the valve housing 13 when fluid is flowing into or attempting to flow into the fluid passageway 15 in a backward direction as indicated by the arrow 27 in FIG. 2 and for preventing fluid from flowing between the second seat member 23 and the valve housing 13 when fluid is flowing into or attempting to flow into the fluid passageway 15 in a forward direction as indicated by the arrow 25 in FIG. 1.

The first means of the fluid by-pass/seal means of the present invention preferably includes a first seal member 29 such as a standard O-ring positioned between the first seat member 21 and the valve housing 13 and preferably includes a first pocket means 31 formed in the valve housing 13 adjacent the first seal member 29 for allowing the first seal member 29 to move thereinto when fluid is flowing into the fluid passageway 15 in a forward direction as indicated by the arrow 25 in FIG. 1 so that the fluid can by-pass the first seal member 29 and flow between the first seat member 21 and the valve housing 13. The fluid passageway 15 preferably has a first enlarged portion 33 in communication with the upstream side 17' of the gate-receiving chamber 17 for receiving the first seat member 21 (see, in general, FIG. 5). The first seat member 21 preferably has an annular groove or offset portion 21' in its outer periphery for receiving the first seal member 29 (see, in general, FIG. 5). The fluid passageway 15 preferably has a first annular groove 35 in the first enlarged portion 33 thereof adjacent to and substantially aligned with the annular groove 21' in the first seat member 21 for defining the first pocket means 31 (see, in general, FIG. 5).

The second means of the fluid by-pass/seal means of the present invention includes a second seal member 37 such as a standard O-ring for being positioned between the second seat member 23 and the valve housing 13 and preferably includes a second pocket means 39 formed in the valve housing 13 adjacent the second seal member 37 for allowing the second seal member 37 to move thereinto when fluid is flowing into or attempting to flow into the fluid passageway 15 in a backward direction as indicated by the arrow 27 in FIG. 2 so that fluid can by-pass the second seal member 37 and flow between the second seat member 23 and the valve housing 13. The fluid passageway preferably has a second enlarged portion 41 in communication with the downstream side 17" of the gate-receiving chamber 17 for receiving the second seat member 23 (see, in general, FIG. 6). The second seat member 23 preferably has an annular groove or offset portion 23' in its outer periphery for receiving the second seal member 37 (see, in general, FIG. 6). The fluid passageway preferably has a second annular groove 43 in the second enlarged portion 41 thereof adjacent to and substantially aligned with the annular groove 23' in the second seat member 23 (see, in general, FIG. 6) for defining the second pocket means 39.

It should be noted that the first and second seal members 29, 37 are preferably formed of an endless member having a substantially circular cross-sectional shape (see FIGS. 1, 2, 5 and 6) and that the first and second annular grooves 35, 43 preferably have a depth equal to at least substantially one-half the cross-sectional diameter of the endless member. For example, the seal members 29, 37 may be formed of an endless member having a cross-sectional diameter of ⅛ inch (0.3175 cm.) and the depth of the grooves 35, 43 may be at least substantially 1/16 inch (0.15875 cm.). Such proportions will allow fluid to by-pass the seal members 29, 37 when the seal members 29, 37 are in the grooves 35, 43 without having to substantially compress the seal members 29, 37 (see, for example, FIG. 5). Also it should be noted that the seal members 29, 37 are preferably constructed of a resilient material (e.g., an elastic rubber) and are preferably of a size that they are normally held within the grooves 21', 23' by their resiliency to normally prevent by-passage of fluid relative to the seal member 29 when fluid is flowing or attempting to flow in a backward direction and to normally prevent by-passage of fluid relative to the seal member 37 when fluid is flowing or attempting to flow in a forward direction. The pressure of the fluid acting downward on the seal members 29, 37 will force the seal member 29 into the groove 35 when the fluid is flowing or attempting to flow in a forward direction and will force the seal member 37 into the groove 43 when the fluid is flowing or attempting to flow in a backward direction in a in a manner which should now be apparent to those skilled in the art.

Figure 5:
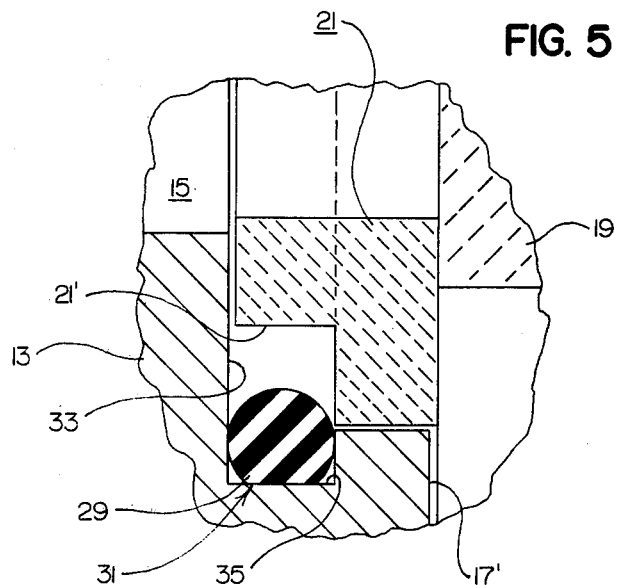
FIG. 5 is a sectional view as taken on line V—V of FIG. 3.
Figure 6:
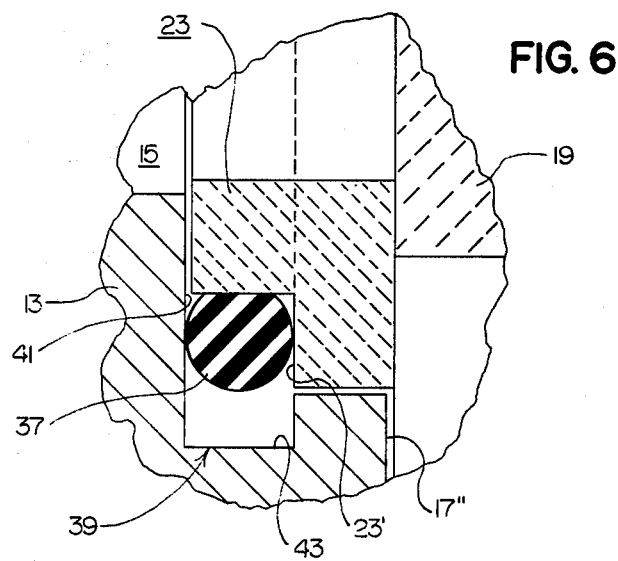
FIG. 6 is a sectional view as taken on line VI—VI of FIG. 4.

The operation of the fluid by-pass/seal means of the present invention is quite simple. When fluid is flowing into or attempting to flow into the fluid passageway 15 in a direction as indicated by the arrow 25 in FIG. 1, the first seal member 29 will be forced into the first pocket means 31 as shown in FIGS. 1 and 5 and the fluid will flow between the first seat member 21 and the valve housing 13 into the gate-receiving chamber 17, and will force the second seal member 37 against the second seat member 23 as shown in FIGS. 1 and 6 to seal the downstream side of the gate-receiving chamber 17. In this manner, any stress created by the pressure of the fluid against the gate member 19 and seat members 21, 23 will be substantially equalized, thereby reducing any chance of fracture or breakage of the gate member 19 and seat members 21, 23. Likewise, when the fluid is flowing into or attempting to flow into the fluid passageway 15 in the direction indicated by the arrow 27 in FIG. 2, the second seal member 37 will move into the second pocket member 39 thereby allowing fluid to pass between the second seat member 23 and the valve housing 13, enter the gate-receiving chamber 17, and force the first seal member 29 to form a seal between the first seat member 21 and the valve housing 13 to prevent improper escapage of any fluid especially when the gate member 19 is closed as shown in FIG. 2.

As thus constructed and operated, the present invention provides a gate valve with means for relieving substantially all of the pressure or stress exerted on the gate member and seats thereof by the fluid passing or attempting to pass therethrough.

Although the invention has been described and illustrated with respect to a preferred embodiment thereof, it is not to be so limited since changes and modifications may be made therein which are within the full intended scope of the invention.

I claim:

1. A fluid by-pass/seal means for use with a gate valve of the type including a valve housing having a fluid passageway therethrough for allowing fluid to flow therethrough and having a gate-receiving chamber positioned substantially transverse to and in communication with said fluid passageway, including a gate member reciprocatingly mounted in said gate-receiving chamber for movement between a position in which fluid is allowed to freely flow through said fluid passageway and a position in which fluid is prevented from flowing through said fluid passageway, including a first annular-shaped seat member positioned in said valve housing intermediate said fluid passageway and said gate-receiving chamber on the upstream side of said gate-receiving chamber, and including second annular-shaped seat member positioned in said valve housing intermediate said fluid passageway and said gate-receiving chamber on the downstream side of said gate-receiving chamber, said fluid passageway having first and second enlarged portions for receiving said first and second seat members respectively, said fluid by-pass/seal means comprising:

(a) a first means positioned intermediate said first seat member and said valve housing for allowing fluid to flow between said first seat member and said valve housing when fluid is flowing into or attempting to flow into said fluid passageway in a forward direction and for preventing fluid from flowing between said first seat member and said valve housing when fluid is flowing into said fluid passageway in a backward direction; said first means including a first seal member positioned between said first seat member and said valve housing and including a first pocket means formed in said valve housing adjacent said first seal member for allowing said first seal member to move thereinto when fluid is flowing into or attempting to flow into said fluid passageway in a forward direction so that the fluid can by-pass said first seal member and flow between said first seat member and said valve housing; and (b) a second means positioned intermediate said second seat member and said valve housing for allowing fluid to flow between said second seat member and said valve housing when fluid is flowing into or attempting to flow into said fluid passageway in a backward direction and for preventing fluid from flowing between said second seat member and said valve housing when fluid is flowing into said fluid passageway in a forward direction, said second means including a second seal member positioned between said second seat member and said valve housing and including a second pocket means formed in said valve housing adjacent said second seal member for allowing said second seal member to move thereinto when fluid is flowing into or attempting to flow into said fluid passageway in a backward direction so that fluid can by-pass said second seal member and flow between said second seat member and said valve housing.

2. A fluid by-pass/seal means for use with a gate valve of the type including a valve housing having a fluid passageway therethrough for allowing fluid to flow therethrough and having a gate-receiving chamber positioned substantially transverse to and in communication with said fluid passageway, including a gate member reciprocatingly mounted in said gate-receiving chamber for movement between a position in which fluid is allowed to freely flow through said fluid passageway and a position in which fluid is prevented from flowing through said fluid passageway, including a first annular-shaped seat member positioned in said valve housing intermediate said fluid passageway and said gate-receiving chamber on the upstream side of said gate-receiving chamber, said fluid passageway having a first enlarged portion in communication with the upstream side of said gate-receiving chamber for receiving said first seat member, and including second annular-shaped seat member positioned in said valve housing intermediate said fluid passageway and said gate-receiving chamber on the downstream side of said gate-receiving chamber, said fluid passageway having a second enlarged portion in communication with the downstream side of said gate-receiving chamber for receiving said second seat member, said fluid by-pass/seal means comprising:

(a) a first means positioned intermediate said first seat member and said valve housing for allowing fluid to flow between said first seat member and said valve housing when fluid is flowing into or attempting to flow into said fluid passageway in a forward direction and for preventing fluid from flowing between said first seat member and said valve housing when fluid is flowing into said fluid passageway in a backward direction, said first means including a first seal member positioned between said first member and said valve housing and including a first pocket means formed in said valve housing adjacent said first seal member for allowing said first seal member to move thereinto when fluid is flowing into or attempting to flow into said fluid passageway in a forward direction so that the fluid bypass said first seal member and flow between said first seat member and said valve housing, said first seat member having an annular groove in its outer periphery for receiving said first seal member, said fluid passageway having a first annular groove in said first enlarged portion thereof adjacent to and aligned with said annular groove in said first seat member for defining said first pocket means; and (b) a second means positioned intermediate said second seat member and said valve housing for allowing fluid to flow between said second seat member and said valve housing when fluid is flowing into or attempting to flow into said fluid passageway in a backward direction and for preventing fluid from flowing between said second seat member and said valve housing when fluid is flowing into said fluid passageway in a forward direction, said second means including a second seal member positioned between said second seat member and said valve housing and including a second pocket means formed in said valve housing adjacent said second seal member for allowing said second seal member to move thereinto when fluid is flowing into or attempting to flow into said fluid passageway in a backward direction so that fluid can by-pass said second seal member and flow between said second seat member and said valve housing, said second seat member having an annular groove in its outer periphery for receiving said second seal member, said fluid passageway having a second annular groove in said second enlarged portion thereof adjacent to and aligned with said annular groove in said second seat means for defining said second pocket member.

3. An improved gate valve of the type including a valve housing having a fluid passageway therethrough for allowing fluid to flow through said valve housing and having a gate-receiving chamber positioned substantially transverse to and in communication with said fluid passageway, including a gate member reciprocatingly mounted in said gate-receiving chamber of said valve housing for movement between a position in which fluid is allowed to freely flow through said valve housing and a position in which fluid is prevented from flowing through said valve housing, including an annular-shaped seat member positioned in said valve housing intermediate said fluid passageway and said gate-receiving chamber on the upstream side of said gate-receiving chamber, said fluid passageway having an enlarged portion for receiving said seat member, and including a seal member positioned between said seat member and said valve housing, wherein the improvement comprises: a pocket means formed in said valve housing adjacent said seal member for allowing said seal member to move thereinto when fluid is flowing into or attempting to flow into said fluid passageway in a forward direction so that the fluid can by-pass said seal member and flow between said seat member and said valve housing, said valve housing having an annular groove therein adjacent said seal member for defining said pocket means.

4. An improved gate valve of the type including a valve housing having a fluid passageway therethrough for allowing fluid to flow through said valve housing and having a gate-receiving chamber positioned substantially transverse to and in communication with said fluid passageway, including a gate member reciprocatingly mounted in said gate-receiving chamber of said valve housing for movement between a position in which fluid is allowed to freely flow through said valve housing and a position in which fluid is prevented from flowing through said valve housing, including an annular-shaped seat member positioned in said valve housing intermediate said fluid passageway and said gate-receiving chamber on the upstream side of said gate-receiving chamber, and including a seal member positioned between said seat member and said valve housing, wherein the improvement comprises: a pocket means formed in said valve housing adjacent said seal member for allowing said seal member to move thereinto when fluid is flowing into or attempting to flow into said fluid passageway in a forward direction so that the fluid can by-pass said seal member and flow between said seat member and said valve housing, said fluid passageway having an enlarged portion in communication with the upstream face of said gate-receiving chamber for receiving said seat member, said seat member having an annular groove in its outer periphery for receiving said first seal member, and said fluid passageway having an annular groove in said enlarged portion thereof adjacent to and aligned with said annular groove in said seat member for defining said pocket means.

5. An improved gate valve of the type including a valve housing having a fluid passageway therethrough for allowing fluid to flow therethrough and having a gate-receiving chamber positioned substantially transverse to and in communication with said fluid passageway, including a gate member reciprocatingly mounted in said gate-receiving chamber for movement between a position in which fluid is allowed to freely flow through said fluid passageway and a position in which fluid is prevented from flowing through said fluid passageway, including a first annular-shaped seat member positioned in said valve housing intermediate said fluid passageway and said gate-receiving chamber on the upstream side of said gate-receiving chamber, including a first seal member positioned between said first seat member and said valve housing, including a second annular-shaped seat member positioned in said valve housing intermediate said fluid passageway and said gate-receiving chamber on the downstream side of said gate-receiving chamber, and including a second seal member positioned between said second seat member and said valve housing, said fluid passageway having first and second enlarged portions for receiving said first and second seat members respectively, wherein the improvement comprises:
(a) a first pocket means formed in said valve housing adjacent said first seal member for allowing said first seal member to move thereinto when fluid is flowing into or attempting to flow into said fluid passageway in a forward direction so that the fluid can by-pass said first seal member and flow between said first seat member and said valve housing; and
(b) a second pocket means formed in said valve housing adjacent said second seal member for allowing said second seal member to move thereinto when fluid is flowing into or attempting to flow into said fluid passageway in a backward direction so that the fluid can by-pass said second seal member and flow between said second seat member and said valve housing.

6. The improvement of claim 5 in which said valve housing has a first annular groove therein adjacent said first seal member for defining said first pocket means, and in which said valve housing has a second annular groove therein adjacent said second seal member for defining said second pocket means.

7. An improved gate valve of the type including a valve housing having a fluid passageway therethrough for allowing fluid to flow therethrough and having a gate-receiving chamber positioned substantially transverse to and in communication with said fluid passageway, including a gate member reciprocatingly mounted in said gate-receiving chamber for movement between a position in which fluid is allowed to freely flow through said fluid passageway and a position in which fluid is prevented from flowing through said fluid passageway, including a first annular-shaped seat member positioned in said valve housing intermediate said fluid passageway and said gate-receiving chamber on the upstream side of said gate-receiving chamber, said fluid passageway having a first enlarged portion in communication with the upstream side of said gate-receiving chamber for receiving said first seat member, including a first seal member positioned between said first seat member and said valve housing, said first seat member having an annular groove in its outer periphery for receiving said first seal member, including a second annular-shaped seat member positioned in said valve housing intermediate said fluid passageway and said gate-receiving chamber on the downstream side of said gate-receiving chamber, said fluid passageway having a second enlarged portion in communication with the downstream side of said gate-receiving chamber for receiving said second seat member, and including a second seal member positioned between said second seat member and said valve housing, said second seat member having an annular groove in its outer periphery for receiving said second seal member, wherein the improvement comprises:
(a) a first pocket means formed in said valve housing adjacent said first seal member for allowing said first seal member to move thereinto when fluid is flowing into or attempting to flow into said fluid passageway in a forward direction so that the fluid can by-pass said seat member and said valve housing, said fluid passageway having a first annular groove in said first enlarged portion thereof adjacent to and aligned with said annular groove in said first slot member for defining said first pocket means
(b) a second pocket means formed in said valve housing adjacent said second seal member for allowing said second seal member to move thereinto when fluid is flowing into or attempting to flow into said fluid passageway in a backward direction so that the fluid can by-pass said second seal member and flow between said second seat member and said valve housing, said fluid passageway having a second annular groove in said second enlarged portion thereof adjacent to and aligned with said annular groove in said second seat means for defining said second pocket means.

* * * * *